United States Patent [19]

Nishikawa

[11] Patent Number: 5,493,163
[45] Date of Patent: Feb. 20, 1996

[54] LENS DRIVING DEVICE EMPLOYING VIBRATION MOTOR WITH BACKLASH COMPENSATION

[75] Inventor: Fumikazu Nishikawa, Yokohama, Japan

[73] Assignee: Canon Kabushiki Kaisha, Tokyo, Japan

[21] Appl. No.: 315,187

[22] Filed: Sep. 29, 1994

Related U.S. Application Data

[63] Continuation of Ser. No. 29,234, Mar. 10, 1993, abandoned.

[30] Foreign Application Priority Data

Mar. 12, 1992 [JP] Japan .................................. 4-053686

[51] Int. Cl.⁶ .............................. H02N 2/14; G03B 3/00
[52] U.S. Cl. .................................. 310/316; 354/400
[58] Field of Search ................................ 310/316, 317; 318/116; 354/400

[56] References Cited

U.S. PATENT DOCUMENTS

| | | | |
|---|---|---|---|
| 4,537,487 | 8/1985 | Taniguchi et al. | 354/400 |
| 4,560,263 | 12/1985 | Katsuma | 310/317 |
| 4,838,693 | 6/1989 | Uchida et al. | 356/356 |
| 4,841,370 | 6/1989 | Murashima et al. | 358/227 |
| 4,857,947 | 8/1989 | Wakabayashi et al. | 354/195.1 |
| 4,987,526 | 1/1991 | Slocum et al. | 364/167.01 |
| 5,077,571 | 12/1991 | Takayama et al. | 354/400 |
| 5,078,145 | 1/1992 | Fukuhata | 128/660.07 |
| 5,079,582 | 1/1992 | Hamada et al. | 354/400 |
| 5,137,358 | 8/1992 | Perkins et al. | 356/350 |
| 5,159,253 | 10/1992 | Shimizu et al. | 310/316 |
| 5,162,831 | 11/1992 | Haraguchi et al. | 354/195.1 |
| 5,173,630 | 12/1992 | Tanaka | 310/316 |
| 5,198,935 | 3/1993 | Imanari et al. | 359/698 |
| 5,202,717 | 4/1993 | Ookubo et al. | 354/400 |
| 5,225,941 | 7/1993 | Saito et al. | 359/824 |
| 5,278,935 | 1/1994 | Furutsu | 388/812 |
| 5,300,850 | 4/1994 | Okumura et al. | 310/323 |

FOREIGN PATENT DOCUMENTS

| | | | |
|---|---|---|---|
| 0144334 | 6/1988 | Japan | 354/400 |
| 63-209481 | 8/1988 | Japan | H02N 2/00 |
| 0130512 | 5/1990 | Japan | 354/400 |

*Primary Examiner*—Thomas M. Dougherty
*Attorney, Agent, or Firm*—Fitzpatrick, Cella, Harper & Scinto

[57] ABSTRACT

A driving device drives a movable member, such as a lens barrel, using a vibration motor through a gear train. The scanning speed of the driving frequency of a periodic signal applied to the motor when the motor is activated is varied according to a backlash of the gear train. In this manner, a movable member can be driven to effect a fine focus adjustment regardless of the existence or non-existence of a backlash in the gear train.

14 Claims, 11 Drawing Sheets

GO TO STEP 15

GO TO STEP 15

LENS DRIVING DEVICE EMPLOYING VIBRATION MOTOR WITH BACKLASH COMPENSATION

This application is continuation of application Ser. No. 08/029,234 filed Mar. 10, 1993, now abandoned.

BACKGROUND OF THE INVENTION

1. Field of the Invention

The present invention relates to a lens driving device for moving a lens for focusing by the driving force of a vibration motor wherein a movable member is driven by vibrations generated in a vibrator by applying a periodic voltage to an electromechanical energy conversion element thereof, such as an electrostrictive element or a piezoelectric element.

2. Description of the Related Art

Methods for adjusting the speed of various types of motors by changing the frequency of a periodic voltage are known.

To set the motor at a desired speed by the above-mentioned methods, a frequency corresponding to the desired speed is selectively applied to the electromechanical energy conversion element. However, such methods have a drawback in that the motor starts rotation rapidly. Also, since the relation between the speed and the frequency is readily affected by the ambient temperature or other environmental conditions, the speed of the motor may change depending on the environmental conditions.

Accordingly, a method for rotating the motor smoothly and for driving the motor at a stable speed independent of changes in the environmental conditions has been proposed. In this method, the drive frequency applied to the motor when the motor is activated is gradually reduced from a high frequency. After it is confirmed that the motor has been activated, the actual rotational speed of the motor is compared with a desired rotational speed. As is known in the art, in an operable range, the driving frequency and the motor speed have an inverse relationship. Thus, when the actual rotational speed is higher than the desired rotational speed, the applied frequency is increased so as to obtain the desired speed. When the actual rotational speed is lower than the desired rotational speed, the frequency is reduced so as to obtain the desired speed.

The motor can be accelerated smoothly to a desired speed in a short period of time by setting the initial driving frequency at a high frequency at which the motor actually starts rotating, and by gradually reducing the frequency from that set frequency. However, the characteristics of the motor are not fixed, i.e., the characteristics of the motor are affected by changes in the environment, such as changes in the ambient temperature. Therefore, when the frequency at which the motor is activated is fixed, it may not be possible to accommodate changes in the ambient temperature or the like. As a result, it may take a longer time for the motor to be activated, or the motor may be activated to rapidly. In the worst case, it may not be possible to activate the motor at all.

In order to solve the above-described problems, Japanese Patent Laid-Open No. Sho 63-209481 has proposed a method in which the frequency at which the motor initially started rotating in the previous drive operation is stored, and in which scanning of the driving frequency is initiated in a subsequent drive operation from that stored frequency toward a lower frequency. In this method, however, it is possible that the motor may not be activated even when frequency scanning is performed in a direction in which the frequency is reduced. In order to avoid such a worst case, scanning may be repeated again starting from the highest frequency of the set frequency range.

When the torque of the motor is small, a helicoid ring is generally rotated through a gear train between the output of the motor and a driving portion of the focusing lens. Such a drive device requires a lens control accuracy of within a few microns, and a lens drive detection mechanism capable of detecting the movement of a lens at a high resolution of within few microns. The lens drive detection mechanism is generally provided at the first stage of the gear train. In the mesh of the gears, a backlash inevitably exists. Therefore, even if the lens drive detection mechanism detects that the lens drive value (the detected number of pulses) has reached a predetermined value representing an amount of lens movement, the actual lens movement may be smaller than that predetermined value by a value corresponding to the backlash of the gears. Furthermore, when when fine adjustment of the lens is desired, that is, when the lens is to be driven through an amount substantially corresponding to the backlash, it may not be moved at all even when the motor is driven.

To solve the above-described problems, various methods have been proposed. Examples of such methods include a method in which the lens is driven by a value that is increased by a number of pulses corresponding to the backlash, and a method in which the detection operation of the lens drive detection mechanism for detecting the drive of the lens is suspended while a backlash exists.

However, in the above-described conventional methods, since the motor is accelerated in the same manner regardless of the existence or non-existence of a backlash, when backlash exists, the motor may be accelerated to a speed higher than the intended speed due to a reduced load of the motor. Therefore, where the lens is to be driven to effect a fine adjustment, the motor may reach the desired stop position before it is sufficiently decelerated, and it may overshoot the desired stop position. This necessitates repeating the drive operation of the lens several times before the lens is focused. In the worst case, the lens may be moved back and forth past the desired stop position (this is called a hunting) and it may not be possible to focus the lens at all.

SUMMARY OF THE INVENTION

An object of the present invention is to provide a drive device which is designed to determine the existence or non-existence of a backlash in the present drive direction from the relation between the previous drive direction and the present drive direction when a movable member, such as a lens, is driven by the output of a vibration motor through a gear train, and to set the acceleration of the motor in accordance with the existence or non-existence of the backlash so as to allow the movable member, such as a lens, to be stopped accurately at a high speed without overshoot.

in one aspect of the present invention, there is provided a lens drive device which moves a lens by the driving force of a vibration motor. The movable member is driven by progressive vibrations formed in a vibrator by the application of a periodic signal to an electromechanical energy conversion element disposed in the vibrator. The driving force is transmitted to the lens through a gear train. The lens drive device controls the drive of the lens and the drive of the vibration motor on the basis of a signal generated from a lens drive detection means and a signal from a lens speed detection means. The lens drive detection means and the lens speed detection means are coupled to the gear train, so as to enable the lens to be stopped at a focused position. The lens drive device includes scanning speed setting means for setting a scanning speed of the driving frequency, and means for changing the scanning speed set by the scanning speed setting means based on a relation between a previous drive direction and a present drive direction. The acceleration of the motor when the motor is activated is changed according to the existence or non-existence of a backlash.

In another aspect, the present invention relates to a drive device for driving a movable member, including actuator means having an electromechanical energy conversion element for producing a vibrational driving force therein in response to an applied periodic signal. Coupling means is provided for transmitting a vibrational driving force from the actuator means to the movable member, to drive the movable member in a first drive direction or a second drive direction different from the first drive direction. Determination means is provided for determining whether a drive direction of the movable member has been changed. A driving circuit applies a periodic signal to the energy conversion element to activate the actuator means. The driving circuit has first and second operation modes for changing a signal characteristic of the periodic signal, and selection means is provided for selecting the first operation mode when the determination means determines that a drive direction has been changed, and for selecting the second operation mode when the determination means determines that a drive direction has not been changed.

In a further aspect, the present invention relates to a driving device for driving a movable member, including actuator means having an electromechanical energy conversion element for producing a vibrational driving force therein in response to an applied periodic signal. A gear train is provided for transmitting the driving force from the actuator means to the movable member, and a control circuit is provided for detecting a backlash in the gear train and for changing a signal characteristic of the applied periodic signal in accordance with the backlash.

In yet another aspect, the present invention relates to a driving device for driving a movable member of a motor by supplying a motor driving force to the movable member through a gear train. The device includes a control circuit for adjusting an electrical signal applied to the motor, said signal being adjusted in accordance with a backlash in the gear train when a drive condition of the motor is changed. The circuit adjusts the signal at a lower rate when it is determined that backlash exists.

Other objects and advantages of the invention will become apparent from the following description taken in connection with the accompanying drawings.

DETAILED DESCRIPTION OF THE PREFERRED EMBODIMENTS

Figure 1:
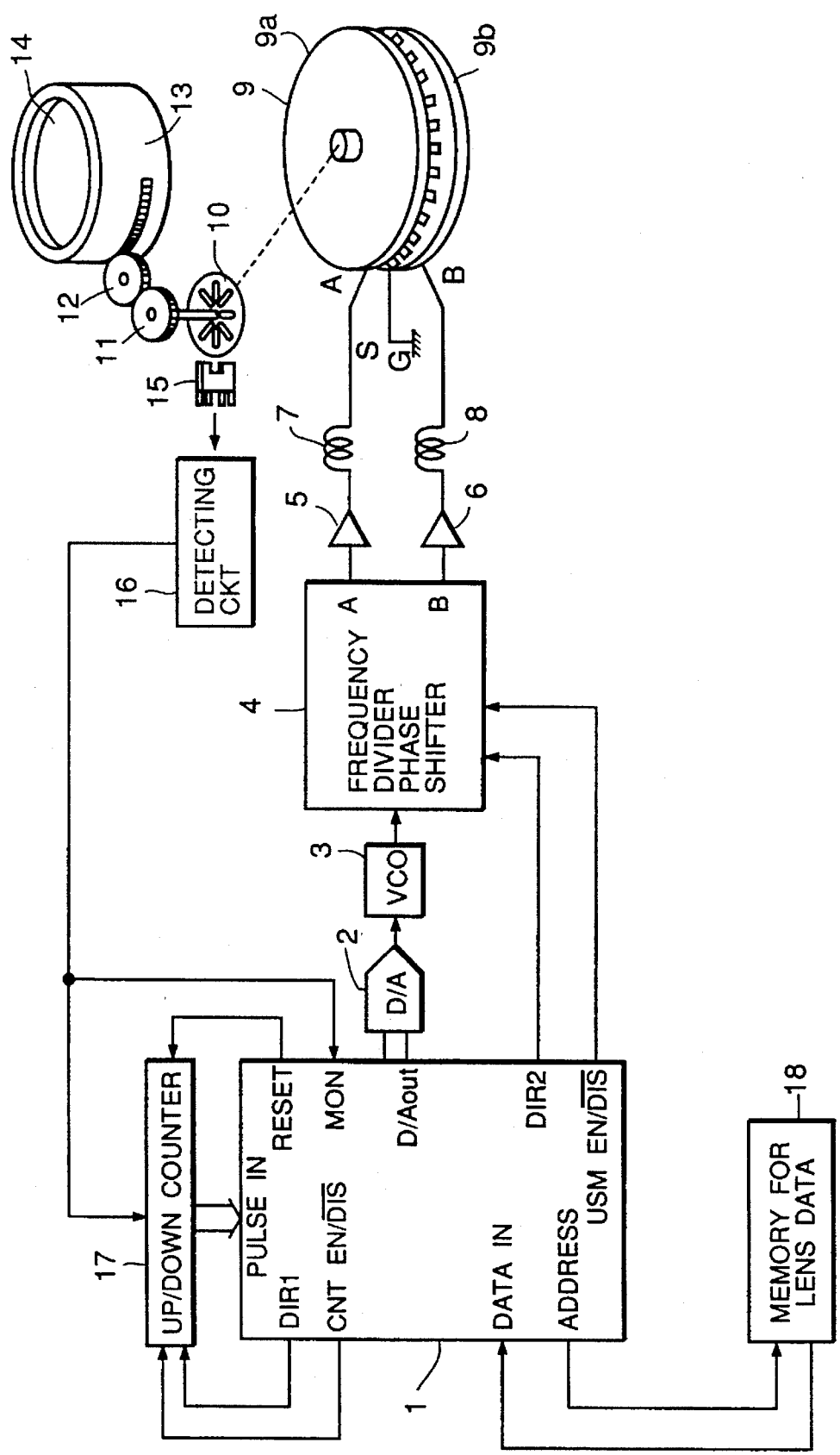
FIG. 1 is a block diagram of a first embodiment of the present invention.

FIG. 1 shows a first embodiment of the present invention. In the figure, reference numeral 1 denotes a microcomputer; 2 denotes a D/A converter for converting a digital output signal (D/Aout) of the microcomputer 1 into an output voltage; 3 denotes a voltage-controlled oscillator (VCO) for outputting a periodic voltage corresponding to the output voltage of the D/A converter 2; 4 denotes a frequency divider/phase shifter for dividing the periodic voltage of VCO 3 and for outputting a rectangular wave having a phase difference of $\pi/2$; 5 and 6 denote power amplifiers for amplifying the periodic voltage output from the frequency divider/phase shifter 4 to a voltage and a current value which can drive a vibration type motor 9; 7 and 8 denote matching coils; 9 denotes a vibration motor having a rotor 9a and a stator 9b; 10 denotes a pulse plate having a plurality of slits in a radial direction, as shown in FIG. 1, and being provided coaxially with respect to the shaft of the vibration motor 9 together with a gear 11 so that it can rotate as the rotor 9a of the vibration motor 9 rotates; 12 denotes a gear which meshes with an outer peripheral gear portion of a lens barrel 13; 14 denotes a lens; 15 denotes a detector for detecting the rotation of the pulse plate 10; 16 denotes a signal detection circuit for amplifying the fine signal of the detector 15 and for converting the amplified signal into a digital signal; 17 denotes an up/down counter for counting the pulse signals generated by the rotation of the pulse plate 10; and 18 denotes a lens data memory (e.g., a ROM) for storing the F number and focal distance which are inherent in an individual lens, as well as a speed table used to drive a focus lens.

The individual terminals of the microcomputer 1 will now be described.

DIR1 is an output terminal for outputting an instruction for the counting direction of the up/down counter 17. For the convenience of explanation, "H" denotes an upward direction; and "L" denotes a downward direction. PULSE IN is an input terminal to which the counted value of the up/down counter 17 is input. MON is a monitor input terminal which directly monitors the output of the detection circuit 16. RESET is a reset output terminal for the up/down counter 17. The up/down counter 17 is reset when "H" is output from this terminal. CNT EN/$\overline{\text{DIS}}$ terminal is an output terminal for outputting a counting enable/disable instruction of the up/down counter 17. Counting of the up/down counter 17 is enabled when "H" is output, and is disabled when "L" is output. D/A out is an output terminal to the D/A converter 2. DIR 2 is an output terminal for outputting an instruction to the frequency divider/phase shifter 4, to change the phase difference between the periodic voltages A and B which is applied to the vibration motor 9, to change the rotational direction thereof. The phase difference is changed back and forth between 90° and 270°. USM EN/$\overline{\text{DIS}}$ terminal is for turning on/off the output of the frequency divider/phase shifter 4. The frequency divider/phase shifter 4 is turned on when "H" is output from this terminal, and is turned off when "L" is output.

The vibration motor 9 will be described below with reference to FIG. 2.

Figure 2:
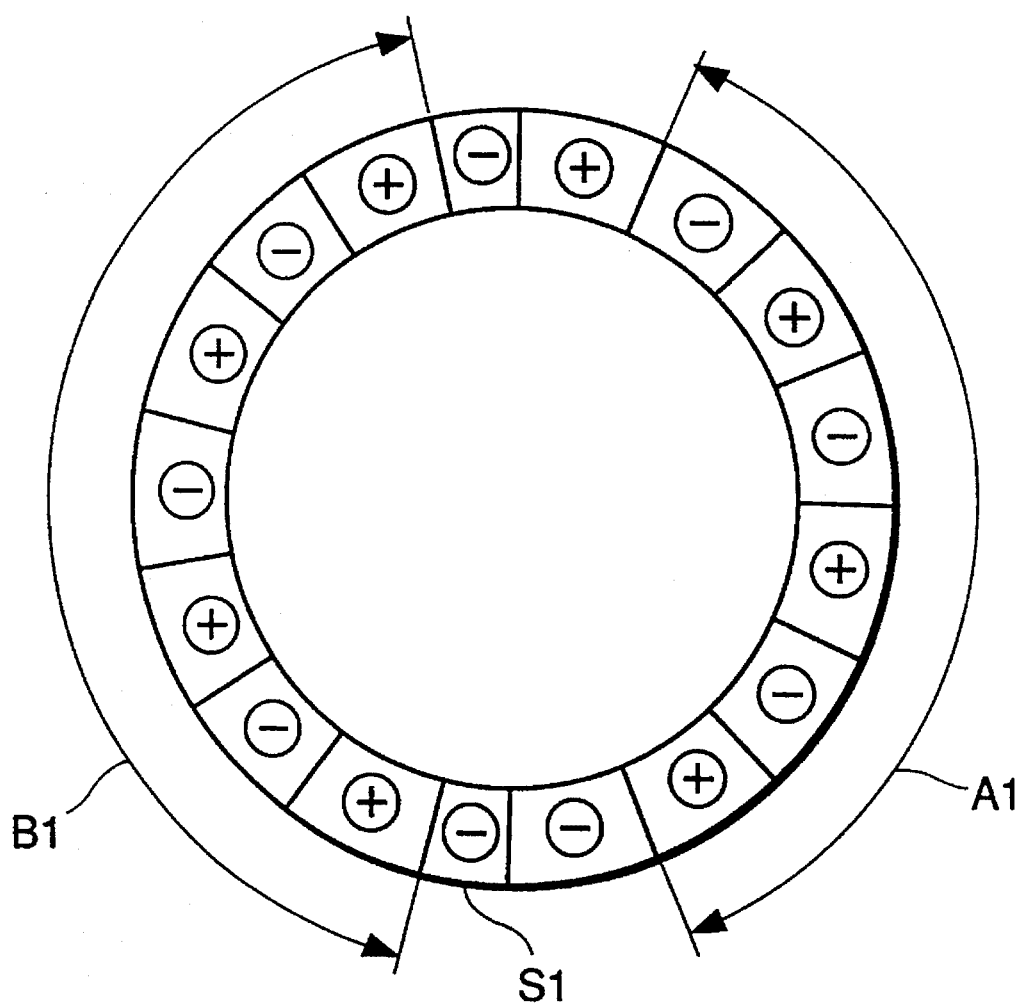
FIG. 2 illustrates how electrostrictive elements are disposed on a rear surface of a stator 9b of FIG. 1.

FIG. 2 illustrates how the electrostrictive elements are disposed on the rear surface of the stator 9b. In FIG. 2, $A_1$ and $B_1$ denote respective first and second electrostrictive element groups disposed on the stator 9b in such a manner that they have the phase and pole relations shown in FIG. 2. $S_1$ denotes an electrostrictive element for a sensor which is disposed at a position 45° out of phase with the first electrostrictive element group $A_1$. The individual electrostrictive elements may be formed as respective elements or as a single element which has been subjected to polarization. Turning back to FIG. 1, A, B and S respectively denote driving electrodes for first and second electrostrictive element groups $A_1$ and $B_1$ and a sensor electrode for the electrostrictive element $S_1$. When the periodic voltage which has passed through the amplifier 5 is applied to the electrode A, while the periodic voltage which has passed through the amplifier 6 is applied to the electrode B, progressive vibrations are formed on the rear surface of the stator 9b. When vibrations are generated in the vibrator, the electrostrictive element $S_1$ outputs an output (a periodic voltage) according to the state of these vibrations. This output is detected by the sensor electrode S. The vibration motor shows a resonant state when the drive voltage applied to the electrode A and the output voltage from the sensor electrode have a special phase relation. That phase relation is determined by the positional relation between the first electrostrictive element group $A_1$, to which a periodic signal is applied by the electrode A, and the electrostrictive element $S_1$. In this embodiment, the motor shows a resonant state in a normally rotated state, when the signal waveform applied to the first electrostrictive element group $A_1$ and the signal waveform output from the electrostrictive element S are out of phase by 135°, and in a reversely rotated state, when these signals are out of phase by 45°. The less the motor is resonated, the more the signals are out of phase.

Figure 3:
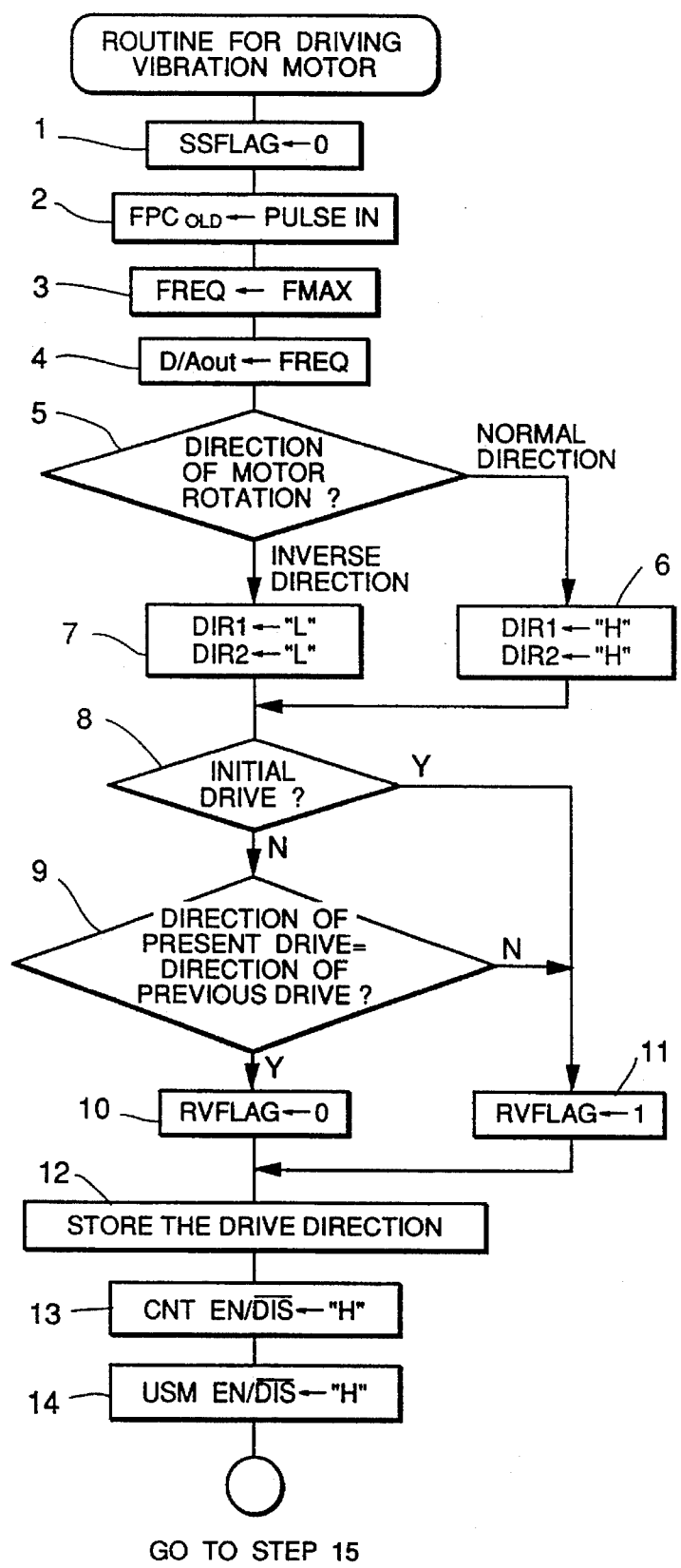
FIG. 3 is a flowchart showing a portion the operation of a first embodiment of the present invention.
Figure 4:
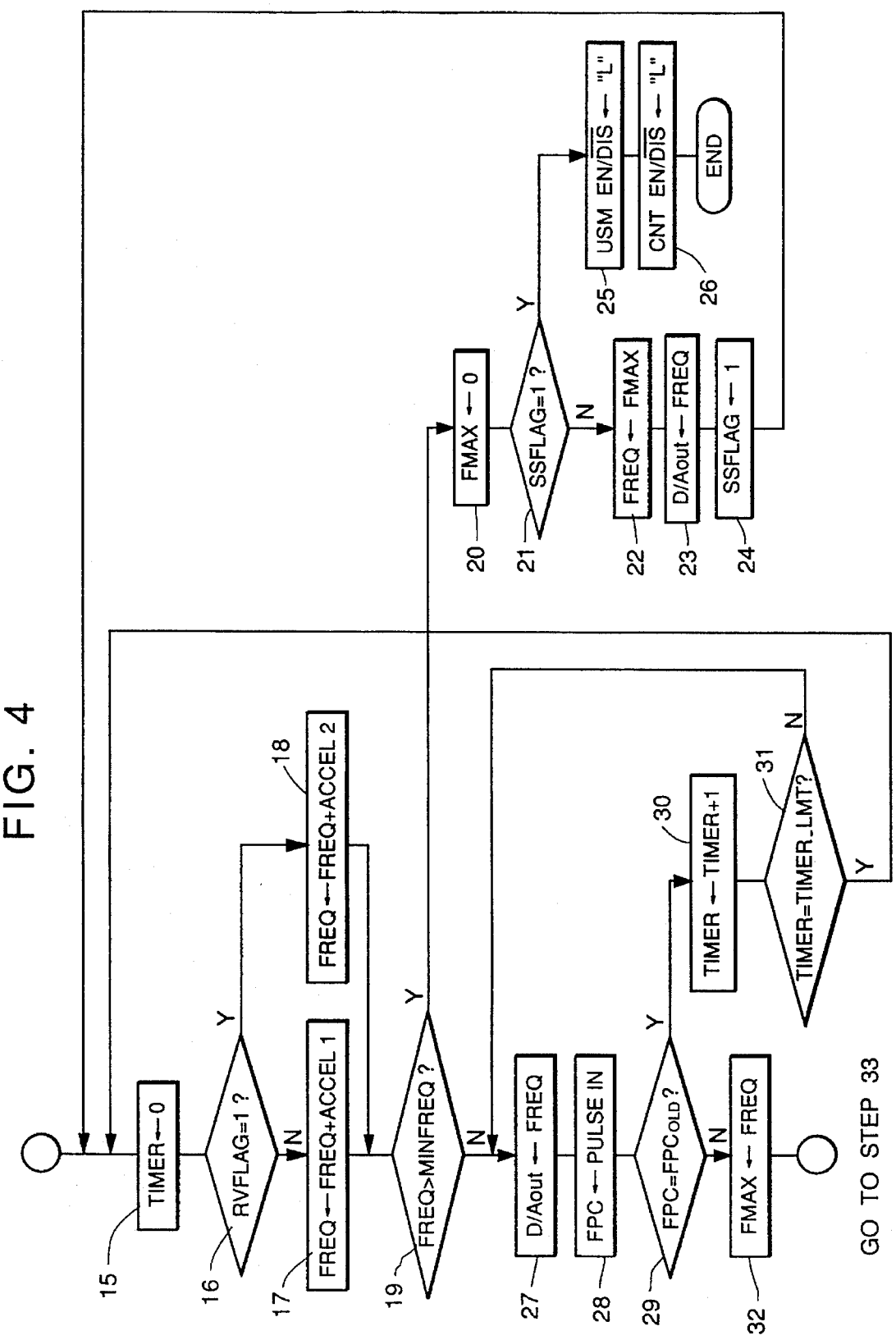
FIG. 4 is a flowchart showing a portion of the operation of the first embodiment of the present invention.
Figure 5:
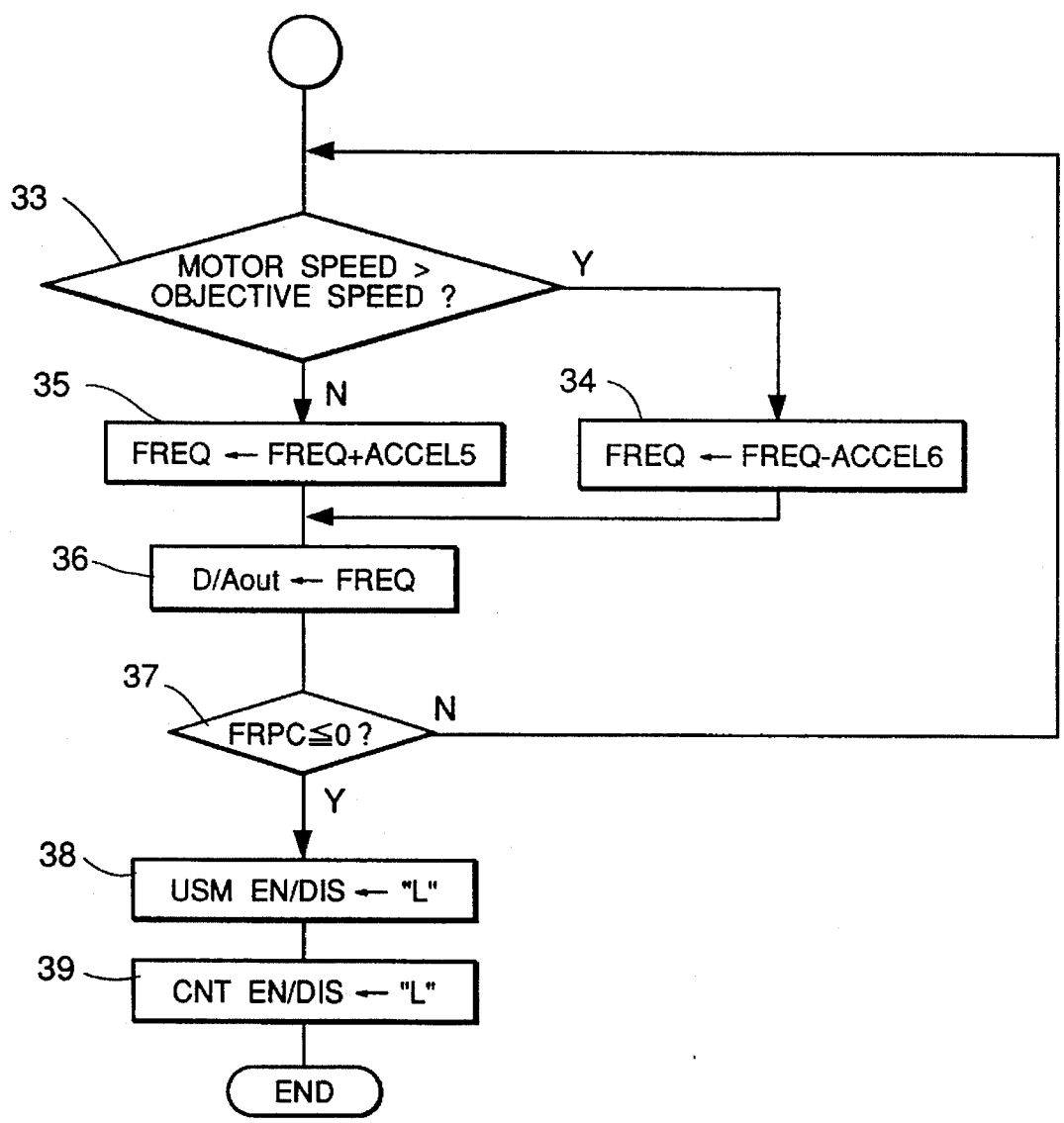
FIG. 5 is a flowchart showing a portion of the operation of the first embodiment of the present invention.

FIGS. 3, 4 and 5 are flowcharts of the program stored in a ROM incorporated in the microcomputer 1. The microcomputer 1 executes this program to perform a control operation. In this embodiment, the helicoid ring serving as the driven member has a sufficiently large frictional resistance.

The operation of the embodiment shown in FIG. 1 will be described below.

When the vibration motor drive control routine is started, the following processing steps are executed starting with the processing of step 1.

Step 1

A flag SSFLAG, which indicates whether the driving frequency is being scanned for a second time in the same drive operation is reset.

Step 2

The initial value of the up/down counter 17 is input to the PULSE IN terminal, and is stored in a variable $FPC_{OLD}$ register.

Step 3

The value stored in a variable FMAX register is transferred to a variable FREQ register. The value stored in the FMAX register corresponds to an initial driving frequency which is determined on the basis of the drive frequency of the previous drive operation. When the motor is stopped normally in the previous drive operation, a value corresponding to the drive frequency at which the motor initially started moving in that operation is stored in the FMAX register. When the motor is stopped in a drive disabled state in the previous operation, the value "0" is stored in the FMAX register. The values stored in the FMAX register and the FREQ register are those values which are actually output from the D/Aout terminal to the D/A converter 2. It will be appreciated that the value FREG and the corresponding driving frequency have an inverse relationship. That is, the smaller the value output from the D/Aout terminal, the higher the drive frequency generated by the D/A converter 2 and the VCO 3.

Step 4

The value set in the FREQ register in Step 3 is output from the D/Aout terminal. D/A converter 2 converts the digital voltage value output from the D/Aout terminal into an analog voltage, and outputs the analog voltage to VCO 3. VCO 3 converts the voltage output from the D/A converter 2 into a frequency signal, and outputs that frequency signal to the frequency divider/phase shifter 4. As noted above, the smaller the value output from the D/A out terminal to the D/A converter 2, the Greater the drive frequency generated by the D/A converter 2 and the VCO 3.

Step 5

The direction in which the motor is to be rotated is determined. When the motor is to be rotated in a forward direction, the process goes to step 6. When the motor is to be rotated in a reverse direction, the process goes to step 7.

Step 6

When it is determined in step 5 that the drive direction is the forward direction, "H" is output from the DIR1 terminal to set the counting direction of the up/down counter 17 in an upward direction. Also, "H" is output from the DIR2 terminal to set the phase difference between the signals A and B output from the frequency divider/phase shifter 4 to 90°, and then the process goes to step 8.

Step 7

When it is determined in step 5 that the drive direction is the reverse direction, "L" is output from the DIR1 terminal to see the counting direction of the up/down counter 17 in a downward direction. Also, "L" is output from the DIR2 terminal to set the phase difference between the signals A and B output from the frequency divider/phase shifter 4 to 270°, and then the process goes to step 8.

Step 8

It is determined whether or not a lens microcomputer is being driven for the first time after resetting. If the lens microcomputer is being driven for the first time, then the process goes to step 11. If the lens microcomputer is not being driven for the first time, then the process goes to step 9.

Step 9

It is determined whether the present drive direction coincides with the previous drive direction. If the directions are coincident, then the process goes to step 10. If the directions are not coincident, then the process proceeds to step 11.

Step 10

A flag RVFLAG, which indicates whether the present drive direction is opposite to the previous drive direction, is reset, and then the process goes to step 12.

Step 11

A flag FVFLAG, which indicates whether the present drive direction is opposite to the previous drive direction, is set, and then the process goes to step 12.

Step 12

The direction of the present drive operation is stored for comparison in a subsequent drive operation.

Step 13

"H" is output from the CNT EN/$\overline{\text{DIS}}$ terminal to enable the up/down counter 17.

Step 14

"H" is output from the USM EN/$\overline{\text{DIS}}$ terminal to enable outputs A and B of the frequency divider/phase shifter 4, whereby the frequency divider/phase shifter 4 outputs signals A and B on the basis of the frequency corresponding to the voltage output from VCO 3 as well as the phase difference corresponding to the level output from the DIR 2 terminal. The output signals A and B are amplified by the power amplifiers 5 and 6, respectively, and then are applied to the vibration motor 9 through the matching coils 7 and 8, to rotate the vibration motor 9.

Step 15

The value "0" is stored in a variable TIMER register. The TIMER register is a counter for determining a fixed time interval at which the driving frequency is reduced when rotation of the motor is not detected.

Step 16

It is determined whether a "1" is stored in RVFLAG. If a "1" is stored in RVFLAG, then the process goes to step 18. If a "1" is not stored in RVFLAG, then the process goes to step 19.

Step 17

A constant value ACCEL1 is added to the value stored in the FREQ register, and the resulting value then is stored in the FREQ register.

Step 18

A constant value ACCEL2 is added to the value stored in the FREQ register, and the resulting value then is stored in the FREQ register. ACCEL1 and ACCEL2 have a relation expressed by ACCEL1>ACCEL2.

Step 19

It is determined whether the value stored in the FREQ register is larger than a value MINFREQ which corresponds to a minimum drive frequency of a predetermined drive frequency range. If the value stored in the FREQ register is larger than the value MINFREQ, then the process goes to step 20. If the value stored in the FREQ register is not larger than the value MINFREQ, then the process goes to step 27.

Step 20

When it is determined in step 19 that the lens driving device is in a disabled state, because no pulse has been input from the detecting circuit 16 to the microcomputer 1 (via the up/down counter 17), even when the drive frequency has been scanned down to a drive frequency corresponding to the value MINFREQ, the value "0" is stored in the FMAX register for a subsequent scanning initiating frequency.

Step 21

It is determined whether the driving frequency is being scanned for a first time or for the second time in the present drive operation. If the driving frequency is being scanned for the second time, then the process goes to step 25. If the frequency is not being scanned for the second time, then the process goes to step 22.

Step 22

The value stored in the variable FMAX register is transferred to the variable FREQ register.

Step 23

The value stored in the FREQ register in step 22 is output from the D/Aout terminal.

Step 24

Flag SSFLAG, which indicates whether the drive frequency is being scanned for the second time in the present drive operation, is set, and the process goes to step 15.

Step 25

When it is determined in step 21 that the motor cannot be activated, even when the drive frequency has been scanned for a second time in the same drive operation, "L" is output from the USM EN/$\overline{\text{DIS}}$ terminal to disable the outputs A and B of the frequency divider/phase shifter 4, whereby the driving operation of the motor is stopped.

Step 26

"L" is output from the CNT EN/$\overline{\text{DIS}}$ terminal to disable counting of the up/down counter 17, whereby the driving operation of the motor is completed.

Step 27

The value stored in the FREQ register is output from the D/Aout terminal.

Step 28

The count valise of the up/down counter 17 is input to the PULSE IN terminal, and the input value is stored in a variable FPC register.

Step 29

The valise stored in the variable FPC register is compared with the value stored in the variable $FPC_{OLD}$ register. If the stored values are equal to each other, then the process goes to step 30. If the stored values are not equal to each other, then the process goes to step 32. In other words, if the detection circuit 16 has detected any rotation of the pulse plate 10, and the up/down counter 17 has thereby started a counting operation, then $FPC \neq FPC_{OLD}$, and the process goes to step 32. If rotation of the pulse plate 10 is not detected, then $FPC = FPC_{OLD}$, and the process goes to step 30.

Step 30

When it is determined in step 29 that rotation of the pulse plate 10 has not been detected, the value stored in the TIMER register is incremented.

Step 31

It is determined whether the value stored in the TIMER register is equal to a predetermined time period TIME_LMT. If the value stored in the TIMER register is equal to TIME_LMT, then the process goes to step 15. If the value stored in the TIMER register is not equal to TIME_LMT, then the process goes to step 27.

Step 32

When it is determined in step 29 that rotation of the pulse plate 10 has been detected, the value stored in the FREQ register, corresponding to the driving frequency at that time, is stored in the FMAX register.

Step 33

The actual motor speed is compared with the desired motor speed, which has been stored in the ROM 18 beforehand on the basis of known data, such as the remaining drive value. If the actual speed is higher than the desired speed, then the process goes to step 34. If the actual speed is lower than the objective speed, then the process goes to step 35. The motor speed is determined by the microcomputer 1, by calculating the period at which the counted value of the counter 17 changes due to detection of the rotation of the pulse plate 10.

Step 34

When it is determined in step 33 that the actual motor speed is higher than the desired speed, then the value obtained by subtracting a constant ACCEL6 from the value stored in the FREQ register is stored in the FREQ register. After the driving frequency is shifted to a higher drive frequency corresponding to the lower value 'FREQ-ACCEL6", the process to step 36.

Step 35

When it is determined in step 33 that the actual motor speed is lower than the desired motor speed, then the value obtained by adding a constant ACCEL5 to the value stored in the FREQ register is stored in the FREQ register. After the driving frequency is shifted to a lower driving frequency corresponding to the higher value "FREG+ACCEL5", the process goes to step 36

Step 36

The value stored in the FREQ register is output from the D/Aout terminal.

Step 37

It is determined whether the value stored in the variable FRPC register is equal to or greater than 0. More specifically, it is determined whether the lens has not yet been driven to a desired drive value, whether the desired drive value has been obtained, or whether overshoot has occurred. If it is determined that the lens has not yet been driven to the desired drive value, then the process goes to step 33. If it is determined that the lens has been driven to the desired drive value, then the process goes no step 39. The value stored in the variable FRPC register is the desired drive value which is set when the routine is initiated. Thereafter, each time a count is performed by the counter 17, the value stored in the FRPC register is decremented.

Step 38

If it is determined in step 37 that FRPC≦0, i.e., if it is determined that the lens has been driven to the desired drive value, or that overshoot has occurred, then "L" is output from the USM EN/$\overline{\text{DIS}}$ terminal to disable the outputs A and B of the frequency divider/phase shifter 4, whereby the driving operation of the motor is stopped.

Step 39

"L" is output from the CNT EN/$\overline{\text{DIS}}$ terminal to disable counting of the up/down counter 17.

In the above-described operation, the initialization steps required to activate the motor are performed in steps 1 through 14. That is, the initial state of the up/down counter 17 is checked, the scanning initiating frequency is output, the rotational direction is determined and set, and the variable registers are initialized in steps 1 through 14. Particularly, in steps 8 through 12, a determination as to whether the present drive direction coincides with the previous drive direction is made, and the existence or non-existence of a backlash is determined on the basis of the results of the determination so as to determine the frequency scanning speed (the motor acceleration) when the motor is activated.

In Steps 15 through 31, the activation of the motor is checked, and the frequency scanning operation is performed. In frequency scanning, each time the predetermined period TIME_LMT has elapsed, the driving frequency is reduced. Prior to confirmation that the motor has been activated, steps 15, 16, 17 or 18, 19, 27, 28, 29, 30, 31 are repeated in the order of 15→16→(17 or 18)→19→27→28→29→30→31→27→ . . . until the predetermined time elapses. After the predetermined time has elapsed, the process returns from step 31 to step 15, and the driving frequency is reduced by adding the predetermined value ACCEL1 or ACCEL2 to the value stored in the FREQ register in step 17 or 18.

In steps 16 through 18, the frequency scanning speed is changed in response to the coincidence or non-coincidence of the direction of the present drive operation with the direction of the previous drive operation. That is, when the present drive direction coincides with the previous drive direction, the driving frequency is reduced by adding the valise ACCEL2 to the value stored in the FREQ register. When the present drive direction does not coincide with the previous drive direction, the driving frequency is reduced by adding the value ACCEL1 to the value stored in the FREQ register. The values ACCEL1 and ACCEL2 have a relation expressed by ACCEL1>ACCEL2. Therefore, when the present drive direction coincides with the previous drive direction, scanning is performed at a higher speed than that when the present drive direction is opposite to the previous drive direction. In other words, the acceleration of the motor when a backlash exists is made smaller than the motor acceleration when no backlash exists, so as to prevent the motor starting rotation rapidly.

If the activation of the motor is confirmed in step 29, then the value stored in the FREQ register, corresponding to the driving frequency at that time, is stored in the FMAX register in step 32. If it is determined in step 19 that the value stored in the FREQ register has exceeded the predetermined value MINFREQ without confirmation that the motor has been activated, then it is inferred that a drive disability has occurred, e.g., that the movable portion of a focus lens is being held by the operator's hand. Thus, the process goes to the frequency re-scanning routine of steps 20 through 26 to prepare for a frequency re-scanning operation.

In the frequency re-scanning operation, the starting frequency is set to the maximum frequency that can be set. It is determined in step 21 whether the routine of steps 20 through 26 is being executed for the first time after the drive operation has started. If the answer is yes (the SSFLAG is in a reset state), re-scanning is performed starting with the maximum frequency. If the routine of steps 20 through 26 has already been executed once (the SSFLAG is in a set state), the process is ended, whereby frequency scanning being performed three times or more in a single drive operation is avoided.

In steps 33 through 37, the rotational speed of the motor is servo controlled to the desired speed. That is, if the actual motor speed is higher than the desired speed, then the driving frequency is increased by adding a predetermined value ACCEL6 to the value stored in the FREQ register. If the actual motor speed is lower than the desired speed, then the drive frequency is reduced by subtracting a predetermined value ACCEL5 from the value stored in the FREQ register. The vibration motor is characterized in that the speed thereof is rapidly lowered when the driving frequency is reduced to a value lower than that corresponding to the maximum speed. Thus, it is desirable that the driving frequency not be changed too rapidly in the vicinity of the maximum speed. Accordingly, the predetermined values ACCEL5 and ACCEL6 are set to small values.

Since the driven member has a large frictional resistance, it is determined that a backlash is generated when the member is driven in the reverse direction of the direction in which the motor has been driven previously, i.e., in a direction opposite to the previous drive direction when the previous drive operation was stopped. Therefore, when the drive operation of a distance ring is initiated in this invention, a determination as to whether the present drive direction coincides with the previous drive direction is made. If it is determined that the directions are coincident, then the motor speed is accelerated in a normal manner. If it is determined that the directions are different, then the acceleration of the motor speed is reduced. Thus, excessive acceleration of the motor =due to a reduction in the load thereof caused by the existence of the backlash can be prevented, and the movement of the lens can thus be accurately stopped even when it is driven to effect a fine adjustment.

Second Embodiment

Figure 6:
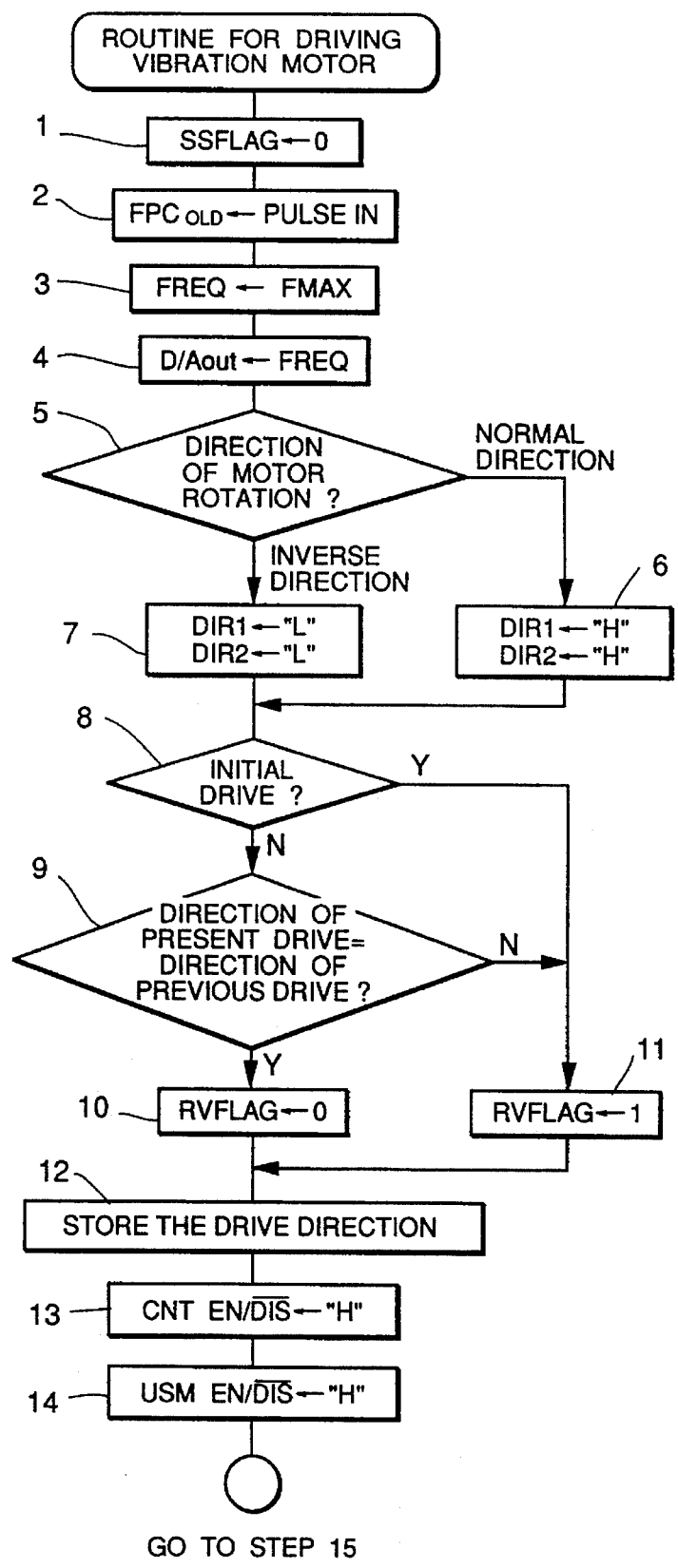
FIG. 6 is a flowchart showing a portion of the operation of a second embodiment of the present invention.
Figure 7:
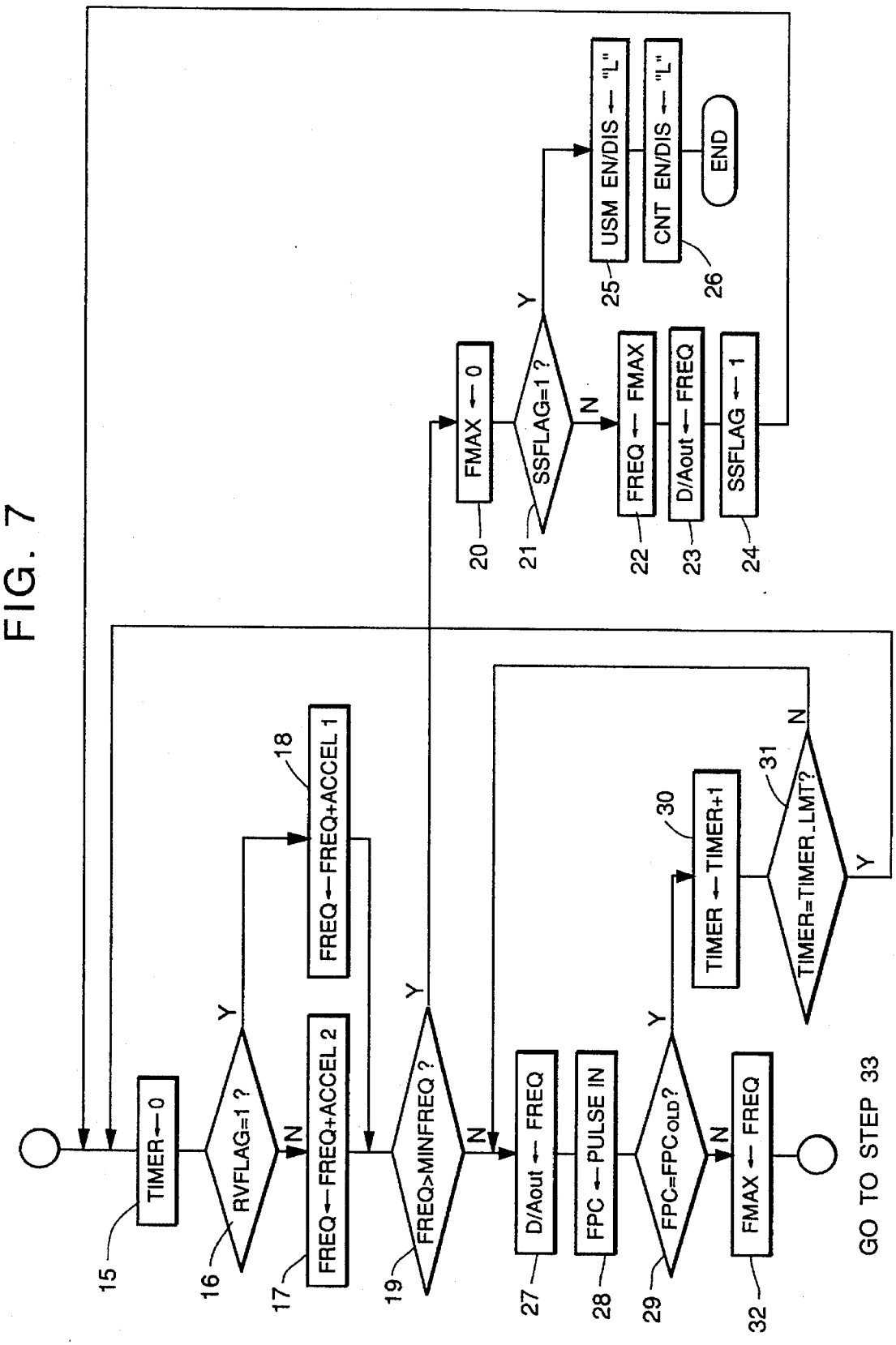
FIG. 7 is a flowchart showing a portion of the operation of the second embodiment of the present invention.
Figure 8:
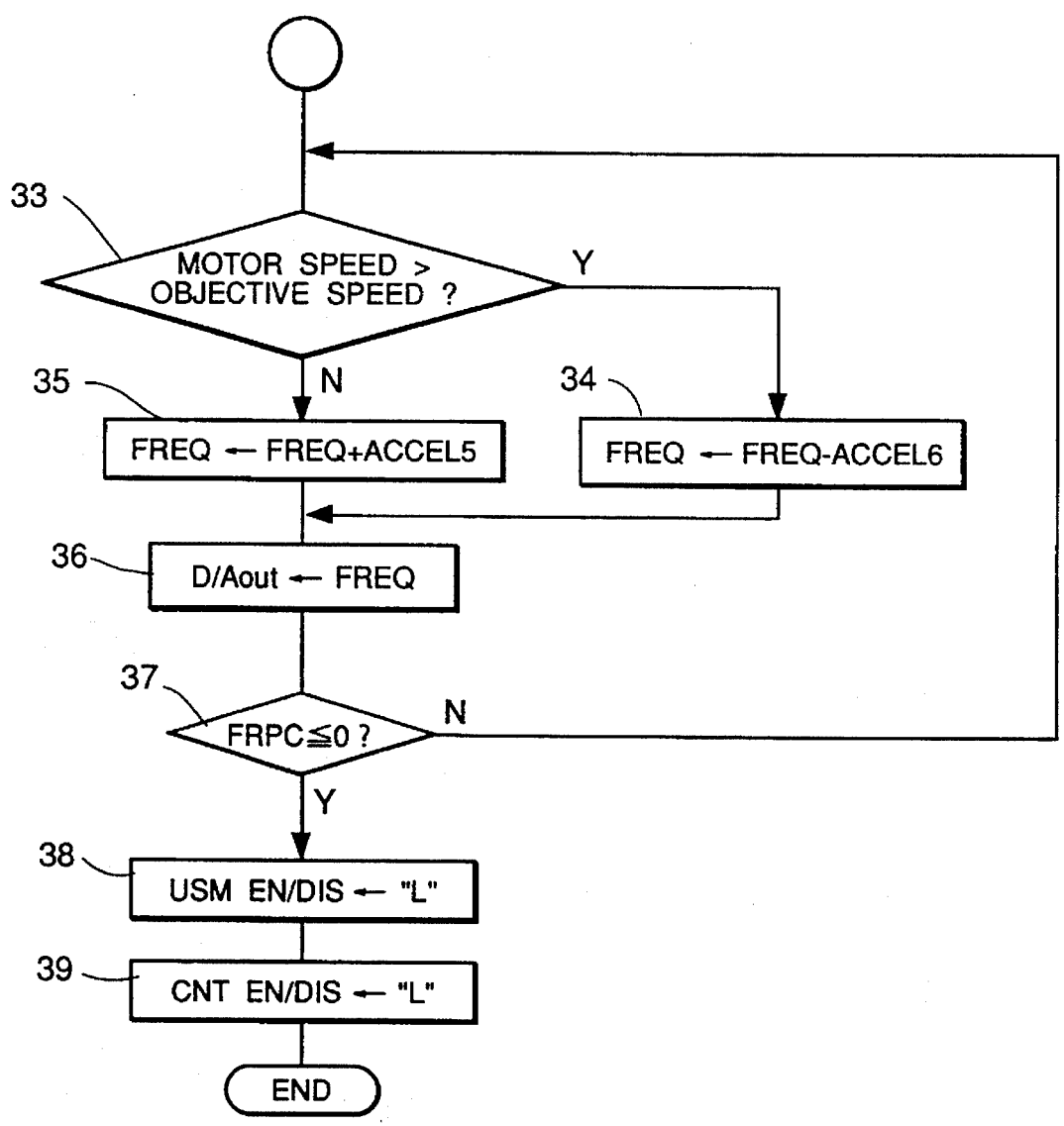
FIG. 8 is a flowchart showing a portion of the operation of the second embodiment of the present invention.

FIGS. 6, 7 and 8 are flowcharts showing the operation of a second embodiment of the present invention. The process flow shown in FIGS. 6 through 8 differs from that shown in FIGS. 3 through 5 in that, if it is determined in step 16 that the present drive direction coincides with the previous drive direction, then the drive frequency is reduced by adding the value ACCEL2 to the value stored in the FREQ register in step 17. If it is determined in step 16 that the present drive direction does not coincide with the previous drive direction, then the drive frequency is reduced by adding the value ACCEL1 to the value stored in the FREQ register in step 18. The values ACCEL1 and ACCEL2 have a relation expressed by ACCEL1>ACCEL2, as in the case of the embodiment shown in FIG. 4. This means that the acceleration when the present drive direction is opposite to the previous drive direction is larger than the acceleration when the present drive direction coincides with the previous drive direction. In other words, the acceleration of the motor when a backlash exists is smaller than the acceleration when a backlash does not exist. Consequently, a rapid rotation of the motor is not conducted. Since the remaining structure of the second embodiment is the same as that of the embodiment shown in FIGS. 3 through 5, a detailed description thereof is omitted.

This embodiment is applied to a driven member having a large inertia. In the case of such a driven member, a backlash occurs when it is being driven in a forward direction, i.e., in the same direction as that in which the driven member previously has been driven, when the previous drive operation was stopped. Therefore, the embodiment shown in FIGS. 6 through 8 is effective when it is applied to a driven member having a large inertia.

Third Embodiment

Figure 9:
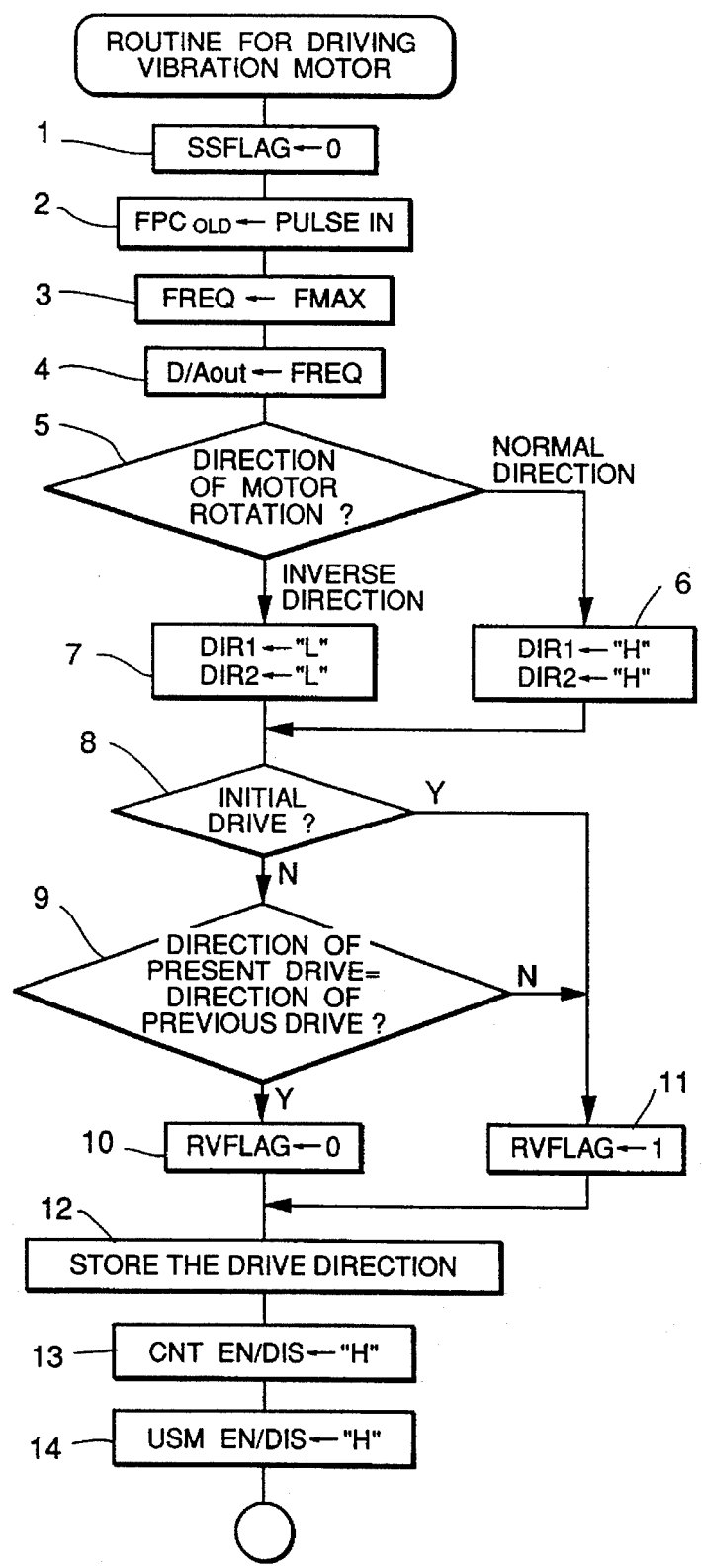
FIG. 9 is a flowchart showing a portion of the operation of a third embodiment of the present invention.
Figure 10:
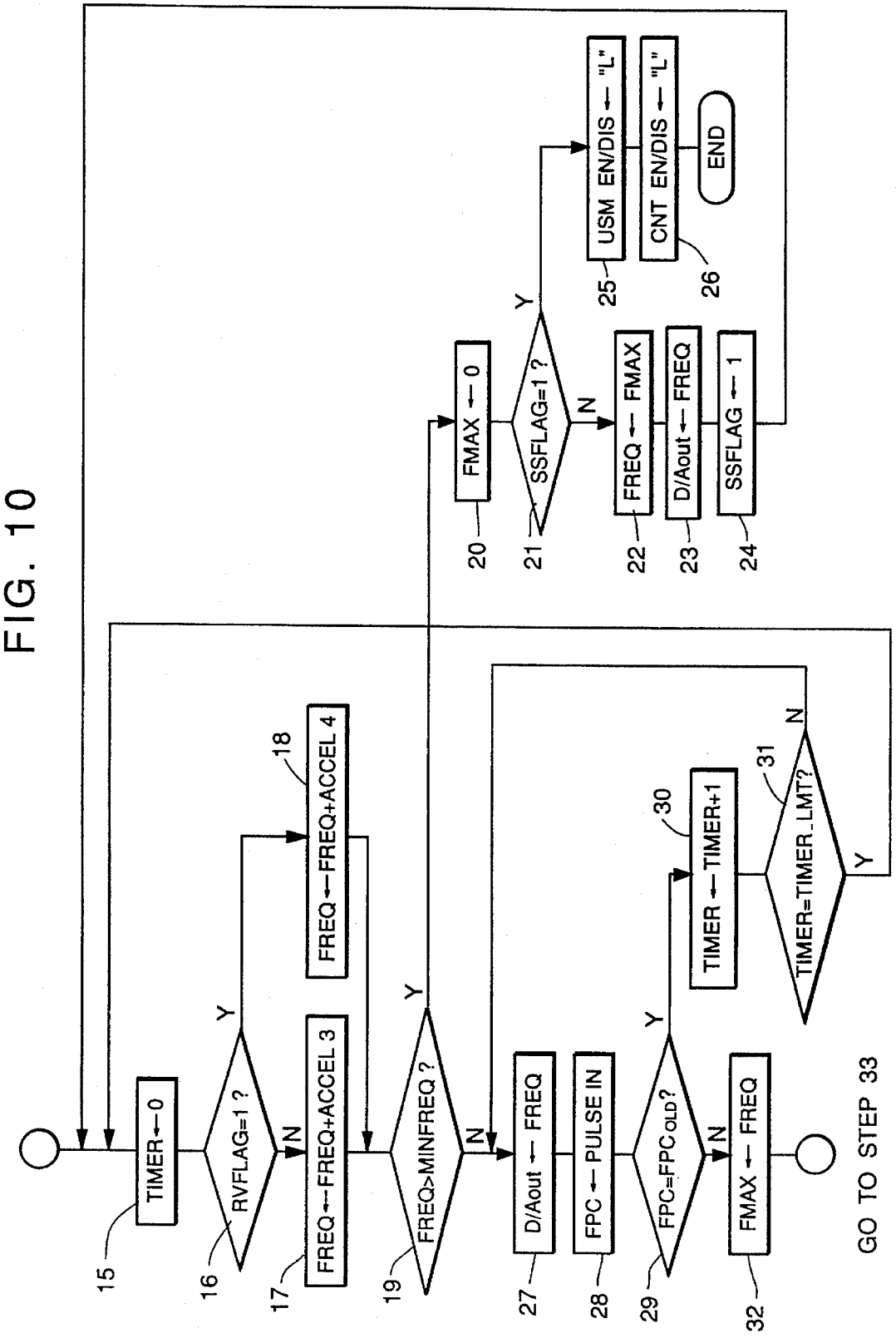
FIG. 10 is a flowchart showing a portion of the operation of the third embodiment of the present invention.
Figure 11:
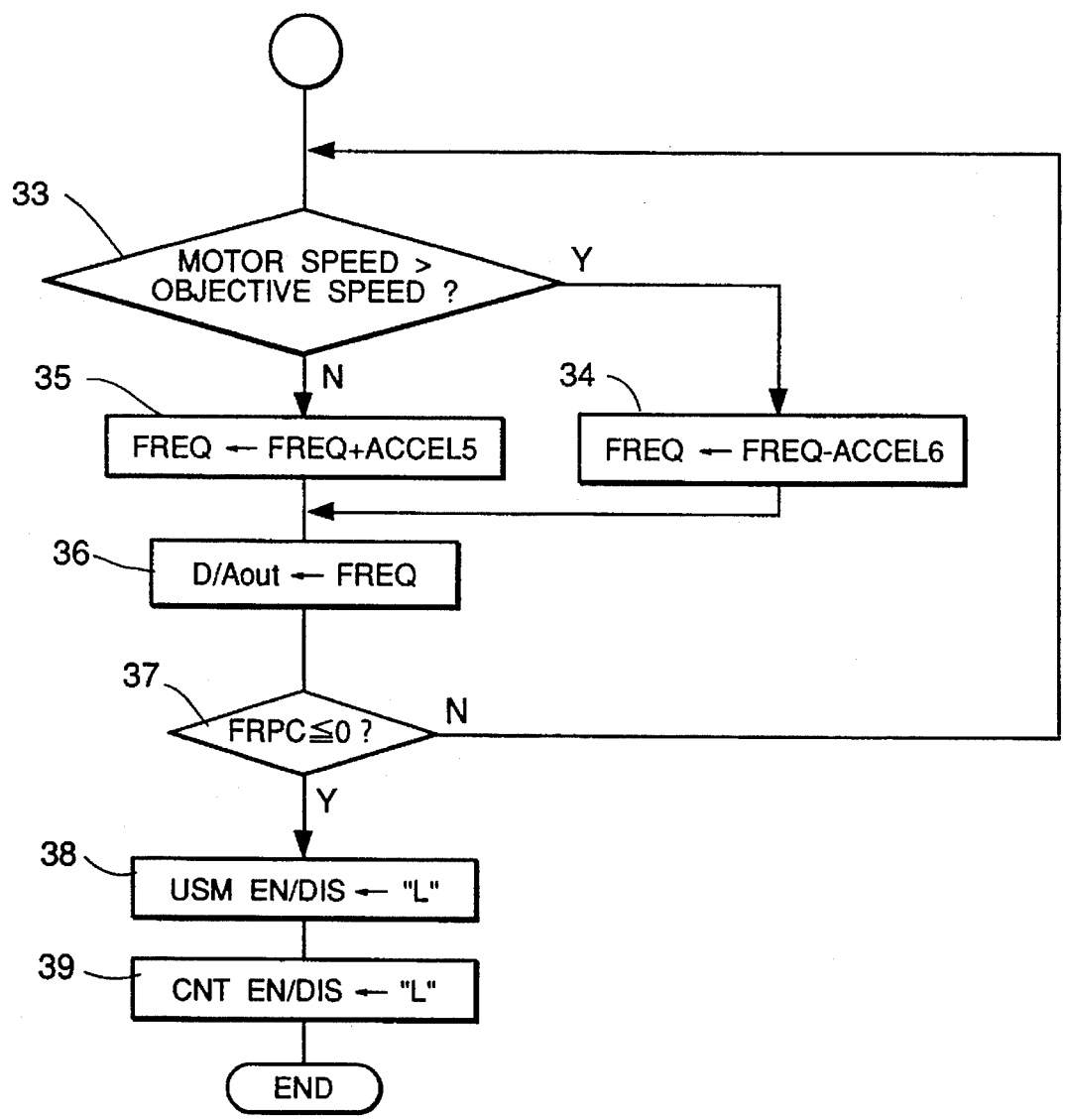
FIG. 11 is a flowchart showing a portion of the operation of the third embodiment of the present invention.

FIGS. 9, 10 and 11 are flowcharts showing the operation of a third embodiment of the present invention. This embodiment is applied to a driven member characterized in that a larger amount of backlash occurs when it is driven in a reverse direction, i.e., in a direction opposite to that in which the motor previously has been driven, while a smaller backlash occurs when it is driven in the forward direction, i.e., in the same direction, when the previous drive operation was stopped.

To make the third embodiment applied to such a device, if it is determined in step 16 that the present drive direction coincides with the previous drive direction, then the drive frequency is reduced by adding the value ACCEL3 to the value stored in the FREQ register in step 17. If it is determined in step 16 that the present drive direction is opposite to the previous drive direction, then the drive frequency is reduced by adding the value ACCEL4 to the value stored in the FREQ register in step 18. The values ACCEL3 and ACCEL4 have a relation expressed by ACCEL3>ACCEL4. Also, the relations between the values ACCEL3, ACCEL4 and ACCEL1, ACCEL2 employed in the embodiment shown in FIG. 4 or 7 are expressed by ACCEL1>ACCEL3 and ACCEL2<ACCEL4. In this embodiment, since the acceleration of the motor is varied according to the amount of the backlash, the lens can be focused at a high speed without overshoot. The remaining structure of the third embodiment is the same as that of the embodiments shown in FIGS. 3 through 5 or FIGS. 6 through 8.

As will be understood from the foregoing description, when the motor is activated in the above-described embodiments, the existence or non-existence of a backlash of a gear train and the amount of backlash thereof are determined from the relation between the present drive direction and the previous drive direction, and the frequency scanning speed is changed in accordance with the existence or non-existence of the backlash and the amount thereof. It is therefore possible to set the optimum motor acceleration in response to the characteristics of the driven member. Also, even if the lens is driven to effect a fine adjustment, overshoot due to the lens reaching the desired stop position before it is sufficiently decelerated, e.g., due to excessive acceleration, is avoided, and a high-speed and accurate focusing operation is made possible.

Furthermore, although the present embodiments describe a system in which the frequency scanning speed is changed, the objects of the present invention may be achieved by a system in which the speed at which a driving voltage changes is changed, e.g., if a backlash is larger, then the driving voltage is changed at a low speed, while if a backlash is small, then the driving voltage is changed at a high speed.

While the preferred embodiment of the invention have been described, such description is for illustrative purposes only, and it is to be understood that changes and variations may De made without departing from the spirit and scope of the following claims.

What is claimed is:

1. A drive device for driving a movable member, comprising:

an actuator, including an electromechanical energy conversion element for producing a vibrational driving force therein in response to an applied periodic signal;

coupling means engaged with said actuator and engageable with a movable member for transmitting a vibrational driving force of said actuator to the movable member to drive the movable member in a first drive direction or a second drive direction different from the first drive direction;

a driving circuit for applying a periodic driving signal having a signal characteristic to said energy conversion element, to activate said actuator and to drive the movable member in the first drive direction or the second drive direction, said driving circuit having a first operation mode for changing the signal characteristic of said periodic signal according to a first change characteristic, and a second operation mode for changing the signal characteristic according to a second change characteristic different from the first change characteristic, thereby to supply a first driving force or a second driving force, respectively;

determination means for determining whether a present drive direction is the same as a preceding drive direction; and selection means, responsive to said determination means and operable with said driving circuit, for selecting said first operation mode when said determination means determines that a present drive direction is the same as a preceding drive direction, and for selecting said second operation mode when said determination means determines that a present drive direction is not the same as a preceding drive direction.

2. The drive device according to claim 1, wherein the change characteristic is a rate of change, and the rate at which said driving circuit changes the signal characteristic of the periodic signal is greater in the first operation mode than in the second operation mode.

3. The drive device according to claim 2, wherein said signal characteristic is a voltage of the periodic signal, the voltage being changed at a first predetermined rate in the first operation mode, and changed at a second predetermined rate in the second operation mode, the second predetermined rate being lower than the first predetermined rate.

4. The drive device according to claim 1, wherein said selection means selects the second operation mode in an initial drive operation of said actuator.

5. The drive device according to claim 1, wherein said signal characteristic is a frequency of said periodic signal, said frequency being changed at a first predetermined speed in said first operation mode, and changed at a second predetermined speed in said second operation mode, said second predetermined speed being lower than said first predetermined speed.

6. The drive device according to claim 5, wherein said selection means selects the second operation mode in an initial drive operation of said actuator.

7. The drive device according to claim 1, wherein said signal characteristic is a frequency of said periodic signal, said frequency being gradually reduced from an initial value, and wherein said frequency is changed at a first rate in said first operation mode and at a second rate, lower than said first rate, in said second operation mode.

8. The drive device according to claim 1, wherein said coupling means comprises a gear train and the movable member is coupled to said actuator through said gear train.

9. The drive device according to claim 1, further comprising a lens barrel as a movable member.

10. A driving device for driving a movable member, comprising:

an actuator, including an electromechanical energy conversion element for producing a vibrational driving force therein in response to an applied periodic signal;

a gear train for transmitting the vibrational driving force from the actuator to a movable member;

a driving circuit for applying a periodic driving signal having a signal characteristic to said energy conversion element to activate said actuator and to drive the movable member; and a control circuit for detecting a backlash in said gear train and for changing the signal characteristic of said periodic signal in accordance with a detected backlash, said control circuit being operable in a first mode for changing said signal characteristic at a first rate of change when a backlash is not detected, and being operable in a second mode for changing said signal characteristic at a second rate of change, slower than the first rate of change, when a backlash is detected.

11. The driving device according to claim 10, wherein said control circuit detects a backlash on the basis of a detected change in direction between a present direction of movement of the movable member and a preceding direction of movement of the movable member.

12. A driving device for driving a movable member of a motor by supplying a motor driving force to the movable member through a gear train, said device comprising:

a drive circuit for applying an electric drive signal to the motor;

detection means for detecting a backlash in the gear train; and a control circuit for adjusting the electric drive signal applied to the motor thereby to adjust a driving force or acceleration characteristic of the motor, and responsive to said detection means, said control circuit being operable in a first mode for changing the motor driving force or the acceleration characteristic at a first rate of change when a backlash is not detected and operable in a second mode for changing the driving force or the acceleration characteristic at a second rate of change, slower than the first rate of change, when a backlash is detected.

13. The driving device according to claim 12, wherein said detection means detects a backlash on the basis of a change between a present direction of movement of said movable member and a preceding direction of movement of said movable member.

14. A driving device for driving a movable member of a motor by supplying a motor driving force to the movable member, said device comprising:

a drive circuit for applying an electric drive signal to the motor;

detection means for detecting a state of mechanical drive load of the motor; and a control circuit for adjusting the electric drive signal applied to the motor, and responsive to said detection means, said control circuit being operable in a first mode for changing said drive signal at a first rate of change, and operable in a second mode for changing said drive signal at a second rate of change, slower than the first rate of change, said control circuit being operated in said first or second mode in accordance with the detected state of mechanical drive load.

* * * * *

UNITED STATES PATENT AND TRADEMARK OFFICE
CERTIFICATE OF CORRECTION

PATENT NO. : 5,493,163  Page 1 of 2
DATED : February 20, 1996
INVENTOR(S) : FUMIKAZU NISHIKAWA It is certified that error appears in the above-indentified patent and that said Letters Patent is hereby corrected as shown below: Title page:

Item:[56] References Cited

"Fukuhata" should read --Furuhata--.

Column 1

Line 57, "to" should read --too--.

Column 2

Line 10, "few" should read --a few--.

Column 6

Line 8, "FREG" should read --FREQ--.
Line 22, "Greater" should read --greater--.

Column 8

Line 16, "valise" should read --value--.
Line 21, "valise" should read --value--.

UNITED STATES PATENT AND TRADEMARK OFFICE
CERTIFICATE OF CORRECTION

PATENT NO. : 5,493,163     Page 2 of 2
DATED : February 20, 1996
INVENTOR(S) : FUMIKAZU NISHIKAWA It is certified that error appears in the above-indentified patent and that said Letters Patent is hereby corrected as shown below:

Column 9

Line 7, "FREG" should read --FREQ--.
Line 21, "no" should read --to--.

Column 10

Line 1, "valise" should read --value--.
Line 63, "=due" should read --due--.

Column 12

Line 19, "De" should read --be--.

Signed and Sealed this

Sixteenth Day of July, 1996

*Attest:*

BRUCE LEHMAN

*Attesting Officer*     Commissioner of Patents and Trademarks